United States Patent [19]
Neidl

[11] 3,843,062
[45] Oct. 22, 1974

[54] PUMP

[76] Inventor: Georg Neidl, Im Bisch 664, Schaan, Liechtenstein

[22] Filed: Dec. 12, 1972

[21] Appl. No.: 314,331

Related U.S. Application Data

[62] Division of Ser. No. 71,351, Sept. 11, 1970, Pat. No. 3,737,110, which is a division of Ser. No. 822,342, Feb. 18, 1969, Pat. No. 3,640,474, which is a division of Ser. No. 452,502, May 3, 1965, Pat. No. 3,502,274.

[52] U.S. Cl. ............... 241/46.11, 241/185 A, 241/86
[51] Int. Cl. ............................................. B02c 13/13
[58] Field of Search ............ 241/46 R, 46.11, 46.17, 241/73, 74, 86, 185 A

[56] References Cited
UNITED STATES PATENTS
| | | | |
|---|---|---|---|
| 2,573,048 | 10/1951 | Newkirk et al. | 241/86 X |
| 3,060,862 | 10/1962 | Neidl | 241/46.11 X |

*Primary Examiner*—Granville Y. Custer, Jr.

[57] ABSTRACT

A combined pumping and filtering mechanism for viscous liquids containing solids comprises a housing defined by surface of revolution and provided with a rotatable inclined plate impeller having at least one marginally positioned shoe to sweep along a portion of the inner peripheral surface of the housing.

8 Claims, 6 Drawing Figures

PUMP

This application is a division of my application Ser. No. 71,351, filed Sept. 11, 1970, now U.S. Pat. No. 3,737,110 which is a division of my application Ser. No. 822,342, filed Feb. 18, 1969, now U.S. Pat. No. 3,640,474, granted Feb. 8, 1972, which is a division of my application Ser. No. 452,502, filed May 3, 1965, now U.S. Pat. No. 3,502,274, granted March 24, 1970.

This invention relates to rotary pumps of the type disclosed in my prior U.S. Pat. Nos. 2,956,503; 3,005,597; 3,060,862; 3,067,960; 3,113,734 and 3,120,353 and more particularly to the development of said type of machines for separating solids and liquids.

In all known filter constructions, whether they used centrifugal force, screens, vacuum, pressure, filter cloth, filter drums, or other means, the filtering machine was construed as a separate single purpose unit. Said constructions presented, in addition, always the difficulty that the filter openings readily clogged and had to be cleaned in relatively short time intervals by scrapers or other means.

It is a principal object of the invention to provide a machine which avoids said drawbacks.

A further object of the invention is to provide a machine which allows of combining processing operations such as mixing, tearing, comminuting, grinding, homogenizing, centrifuging, milling, kneading as well as separating, sorting, distilling with a filtering and pumping action.

Further objects and advantages of the present invention will be apparent from the following description, reference being had to the accompanying drawings, wherein preferred embodiments of the invention are shown by way of example.

The separation processes in which the present apparatus may be employed often require the use of pump housings having a series of apertures provided in the walls thereof. Said apertures have, in all embodiments of the invention, in view of the specific problem involved, not only varying profiles (holes, slots, triangles, squares, polygons, ellipses, etc,) but also the position of their axes need not be radial to the center of the machine, like in FIG. 1. Inclined positions, particularly in the direction of rotation of the impeller, are often of advantage. Further, the cross section of the openings 89 need not be constant over the whole length of the perforation. Tests have shown that, for instance, in the extraction of hops in beer brewing, conical forms are quite satisfactory; thereby, the openings flare conically towards the outside.

Also the length of the perforations is important. On viewing, e.g., FIG. 1, it will be readily visualized that the working chamber need not be simply perforated, as shown. Screening or straining inserts of various forms can be employed. Gauze or fabric screens can be used which are stretched over suitable supports. In a machine as shown in FIG. 1, for instance, circular or semicircular supports may be employed, also more or less fine-meshed grates can be used.

Also the dimensions of the straining, screening or filtering means are important. I prefer to use as the innermost sieve, i.e. on the smallest diameter, a coarse mesh which is followed outwardly by sieves of increasingly finer mesh.

For producing the desired effects, not only the parameters discussed hereinabove are of importance, but also the form and shape of the rotor.

Figure 1:
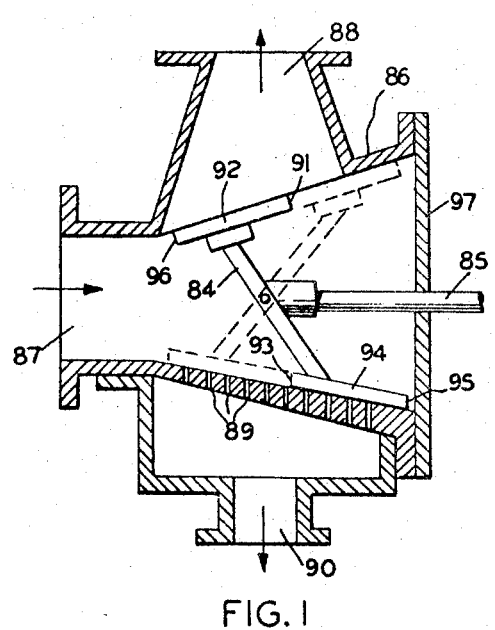
FIG. 1 shows a machine with conical rotor and conical housing which is suitable as for filtering and refining.
Figure 5:
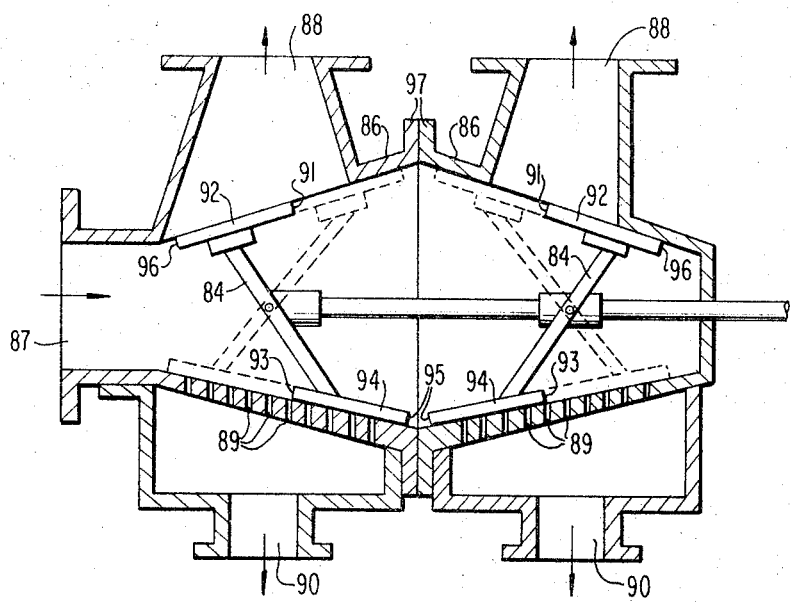
FIG. 5 is a cross-section of a machine having two rotors on a single shaft.

In the modification of the invention shown in FIG. 1, the rotor 84, driven by the shaft 85, rotates in a conical housing 86, which has an intake 87 and an outlet 89 and is provided with perforations 89. The filtrate is withdrawn at 90. In operation of the machine, the edge 91 of the upper rotor shoe 92 registers with the edge 93 of the lower rotor shoe 94. The conicity of the chamber produces very strong friction, grinding, shearing, thrust, impact, pressure, lubricating, and sliding forces which, like in the known refiner constructions of the paper manufacture, multiply not only because, in contrast to the full cone of the refiners, the construction of FIG. 1 leaves more by-pass space to the material. In addition, the design of the shoes 94 and 92 as double or multple shoes is of importance; in the extreme case, the shoes may form a closed ring whose one outer rim extends from 91 to 95 and the other outer rim extends from 96 to 93. The exact design will depend on whether dry or slush operation is desired. Two such refiners can be combined in such a way that the wide rim 97 of the frustum of FIG. 1 remains open and connects to said rim of a similar machine without inlet, whereby the shaft 85 is prolonged to the right and drives both rotors, as shown in FIG. 5. Each cone may receive its own outlet 88 and drain-off 90, or both cones may have a common pressure outlet and drain.

In the refining treatment of fibers from rags, wood chips, bagasse, or synthetic materials, it is desirable to use not too much fluid. According to an old papermaking rule, the result is the better the thicker the stock, simply because in such case the internal friction becomes better. This is accomplished in the machine of FIG. 1 by the outlet 90.

It is a common feature of all the machines here disclosed that, without exception, they exert a pumping effect, for instance through 88 in FIG. 1. The desired gradation of the density or consistency is accomplished by a valve system as shown in FIG. 1a of my prior application Ser. No. 452,502, now U.S. Pat. No. 3,502,274.

Figure 2:
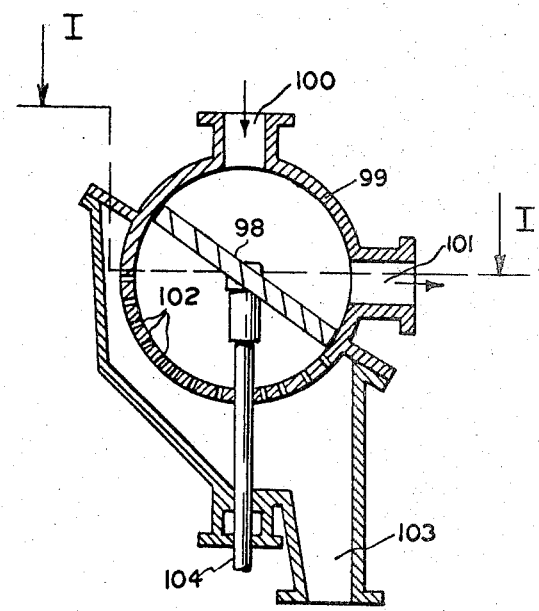
FIG. 2 is a vertical cross sectional view of a machine according to the invention where the housing is formed as a body of revolution.
Figure 6:
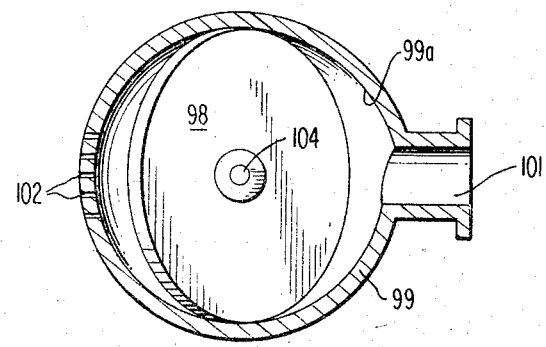
FIG. 6 is a horizontal cross-section of the machine of FIG. 2.

The rotor 98 of FIG. 2 is rotated on shaft 104 in a housing 99 which is a body of rotation. The material is charged at 100 and delivered at 101. The housing is provided with apertures 102, and the filtrate is drained off at 103. The machine should be considered as being in upright position; the operation is generally the same as set forth hereinbefore. It is often of advantage to make the housing 99 along line I—I in its equatorial plane not completely concentric to the rotor 98 but to extend the equator inside in the direction of rotation slightly spirally, as at 99a, to the outlet nipple 101 as shown in FIG. 6. Such "spherical engines" are particularly suitable for the delivery of material being shoveled (moisture content only 20 to 30 per cent). Such pumps having a body of rotation as shell and a hollow rotor 98 to which steam is supplied through a hollow shaft 104, when designed and operated in accordance with this invention, are excellent e.g. for boiling wood chips and for similar thickening operations.

Figure 3:
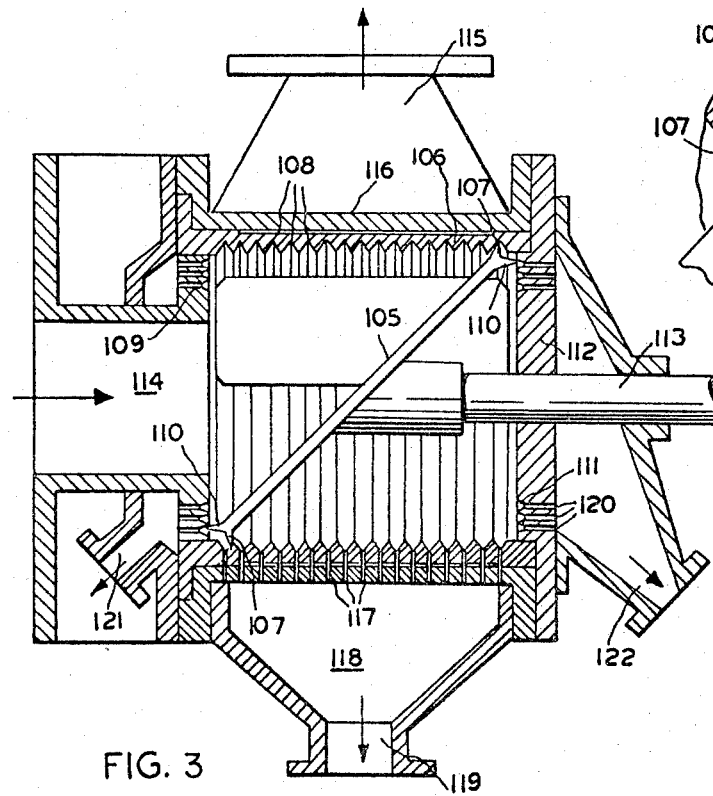
FIG. 3 is a longitudinal section, partly in elevation showing a machine according to the invention which is particularly suitable for beating and comminuting operations.
Figure 4:
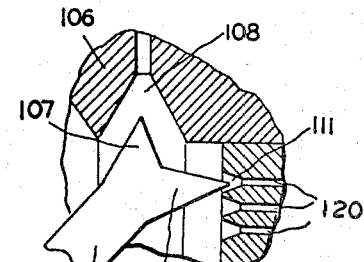
FIG. 4 shows a detail.

The rotor disc 105 of the machine illustrated in FIG. 3 is provided with teeth 107 received in radial grooves 108 of the bushing 106. The rotor 105 is further provided also with lateral teeth 110 which rotate in grooves 111 of the cover plate 112 (FIG. 4); said grooves 111 are concentric to the shaft 113. The material enters through inlet 114 and is delivered through outlet 115. So far, the machine is similar to that shown in FIGS. 3 and 4 of my U.S. Pat. No. 3,067,960. In addition, however, the bushing 106 and the housing 116 are provided with perforations 117; in this way, filtrate collects in the space 118 and is withdrawn through outlet 119. Also the grooves 111 of the cover 112 terminate in passages 120, which are horizontal. Corresponding grooves 110 and passages 109 are provided at the left hand side of the machine. The material delivered laterally through said passages 109 and 120 is withdrawn through outlet nipples 121 and 122. Due to the coacting centrifugal force, the delivery through the perforations 117 is greater than the delivery through the passages 109, 120; this effect may be utilized for a fractionated separation.

The machine of FIG. 3 does not only separate but produces also a very strong tearing action. A particular advantage is that the passages will not clog. The teeth 110 and 107 run with relatively close clearance in their respective grooves 108 and 111, thereby forcing the material through the apertures 109, 117, and 120. Solids which are larger than the cross-sections of 109, 117 and/or 120 are revolved in the machine so long until they are sufficiently disintegrated and can pass whereby the outlet 115 is throttled or a cycle is established as shown in FIG. 1a as shown in my prior U.S. Pat. No. 3,502,274.

The form of the teeth 107 and 110 need not be triangular as shown in the drawing. As shown from the crushers of the sugar cane industry, the teeth may assume the most various forms, sizes, thicknesses, widths, heights, etc. according to the particular problem (Handbook of Cane Sugar Engineering by E. Hugot, Elsevier Publishing Company, Amsterdam/London/New York/Princeton, 1960).

If the machine of FIG. 3 is employed as an immersed pump, the inlet 114 will be suspended downwardly, the shaft 113 will extend upwardly, and the outlets 115 and 119 will be directed laterally to the left and right, respectively. The whole system may be suspended in a tank, e.g. for the processing of synthetic materials. Frequently, an elbow will be connected to nipple 115 which ends in the tank itself. The flow delivered through 115 stirs the contents of the tank and is drawn in again through 114. At the same time, filtrate may be ejected through outlets 119 into the same tank and also sucked in again at 114. On the other hand, outlet 119 may be connected over an elbow to a conduit which allows to collect the filtrate outside the tank. In such cases, it is often of advantage to provide double outlets 115, 119, 121, and 122.

I claim:

1. A pump and strainer assembly comprising a stationary pump housing formed by walls defining a pump chamber therein, an impeller rotating in said housing, a drive shaft for said impeller extending axially into said pump housing, said impeller being secured to said shaft for rotation in planes inclined to said shaft, a shell enclosing at least part of said pump housing said shell forming with the walls of said enclosed pump housing a separate chamber, strainer passages connecting said pump chamber and said separate chamber, an inlet for said pump chamber, and individual outlets each for said pump chamber and said separate chamber, said housing being conical and the inclined impeller being equipped at both ends with shoes sweeping along said conical inner periphery of the housing.

2. An assembly as claimed in claim 1 wherein said shoes are dimensioned to produce adjoining sweeping ranges.

3. An assembly as claimed in claim 2 wherein said shoes form a closed ring.

4. An assembly consisting of two units as claimed in claim 1, said units being assembled as mirror images, the impellers of said units being mounted on a common shaft.

5. An assembly as claimed in claim 1 comprising an auxiliary pump in said pipe connection.

6. A pump and strainer assembly comprising a stationary pump housing formed by walls defining a pump chamber therein, an impeller rotating in said housing, a drive shaft for said impeller extending axially into said pump housing, said impeller being secured to said shaft for rotation in planes inclined to said shaft, a shell enclosing at least part of said pump housing said shell forming with the walls of said enclosed pump housing a separate chamber, strainer passages connecting said pump chamber and said separate chamber, an inlet for said pump chamber, and individual outlets each for said pump chamber and said separate chamber, said pump housing having substantially the form of a hollow sphere.

7. An assembly as claimed in claim 6 wherein said housing, in a section perpendicular to said shaft, is spirally enlarged in direction towards the outlet.

8. An assembly as claimed in claim 1 comprising tooth means at said impeller and grooves in the walls of said pump housing receiving said tooth means, at least some of said strainer passages opening into said grooves.

* * * * *